US00RE38161E

(19) United States
(12) Reissued Patent
Viney

(10) Patent Number: US RE38,161 E
(45) Date of Reissued Patent: Jul. 1, 2003

(54) HIGH SEED YARN KNITTING APPARATUS

(75) Inventor: Donald I. Viney, Ripon (GB)

(73) Assignee: Scotnet (1974) Limited, Glasgow (GB)

(21) Appl. No.: 08/946,105

(22) PCT Filed: Dec. 23, 1988

(86) PCT No.: PCT/GB88/01147

§ 371 (c)(1),
(2), (4) Date: Aug. 24, 1990

(87) PCT Pub. No.: WO89/05879

PCT Pub. Date: Jun. 29, 1989

Related U.S. Patent Documents

Reissue of:
(64) Patent No.: 5,207,079
Issued: May 4, 1993
Appl. No.: 07/536,675
Filed: Aug. 24, 1990

(30) Foreign Application Priority Data

Dec. 23, 1987 (GB) ..... 8729992

(51) Int. Cl.[7] ..... D04B 25/02
(52) U.S. Cl. ..... 66/9 R
(58) Field of Search ..... 66/9 R, 135, 193

(56) References Cited

U.S. PATENT DOCUMENTS

| | | | | |
|---|---|---|---|---|
| 2,171,445 | A | 8/1939 | Getaz | 66/135 |
| 3,182,471 | A | 5/1965 | Fried | 66/135 |
| 3,513,668 | A | 5/1970 | Mintz | 66/193 |
| 3,593,024 | A | 7/1971 | Levin | 66/135 X |
| 4,099,389 | A | 7/1978 | Herbein | 66/9 R |

FOREIGN PATENT DOCUMENTS

| | | | |
|---|---|---|---|
| DE | 428953 | | 2/1923 |
| DE | 4405366 | A1 | 8/1995 |
| EP | 0 393 136 | B1 | 5/1994 |
| FR | 2 568 278 | | 7/1984 |
| GB | 167358 | | 8/1921 |
| GB | 378474 | | 8/1932 |
| GB | 450156 | | 7/1936 |
| GB | 526337 | | 9/1940 |
| GB | 636963 | | 5/1950 |
| GB | 1303079 | | 1/1973 |
| GB | 1318369 | | 5/1973 |
| GB | 1325739 | | 8/1973 |
| GB | 1335494 | | 10/1973 |
| GB | 1 384 522 | | 2/1975 |
| GB | 2 058 849 | A | 4/1981 |
| GB | 2210632 | A | 6/1989 |
| GB | 2 214 198 | A | 8/1989 |

*Primary Examiner*—John J. Calvert
*Assistant Examiner*—Larry D. Worrell, Jr.
(74) *Attorney, Agent, or Firm*—Alston & Bird LLP

(57) ABSTRACT

A knitting machine is described in which the elastic thread packages (26) are mounted in a stationary position away from the knitting head (22). This results in reducing the revolving mass and the space necessary to accommodate the revolving mass. Furthermore, the commencement of wind on the package (26) can be left as a tail which is knotted to the free end of a second package thus permitting the machine to run continuously without stopping to change packages. A plurality of like knitting heads (22) is mounted in relatively close proximity in a single knitting head frame (24) in such a manner that chain stitches are fed from a power driven warp beam (12, 16, 20). Each knitting head includes yarn positioning apparatus in which yarn (12) fed to each needle (30) of the knitting head (22) is moved under tension with minimal friction to a position where the needle (30) traps the yarn (12) on its downward stroke. Embodiments of the invention are described.

42 Claims, 9 Drawing Sheets

HIGH SEED YARN KNITTING APPARATUS

Matter enclosed in heavy brackets [ ] appears in the original patent but forms no part of this reissue specification; matter printed in italics indicates the additions made by reissue.

The prevent invention relates to apparatus for producing tubular fabrics consisting of a number of separate chain stitches connected by an inlaid thread typically, elastic or similar yarn. In particular, the invention relates to a high speed yarn knitting apparatus for knitting netting for covering food products, and in particular meat.

High speed yarn knitting apparatus should satisfy a number of desirable criteria in addition to being reliable, fast and relatively inexpensive. It should permit the fabric to be continuously knitted and should require a minimal amount of space and be relatively lightweight. The supplies of yarn should be readily changed or added to without interrupting the operation of the machine and a counterweight should not be required to avoid imbalance at high speed. The high speed knitting apparatus should have yarn positioning apparatus which uses a minimal number of moving parts and wear and tear of knitting elements and yarn should also be minimised. Higher tensions of yarn should be obtainable so that knitting speeds can be increased. The apparatus should also minimise the splitting of yarn and the dropping of stitches.

Prior art knitting machines are of two general types. The first type consists of a machine which can make several rolls at a single time using a reciprocal movement. However, this machine is large and the reciprocal movement is very slow, thus limiting the amount of rolls of knitted fabric which can be produced in a certain time. The second type of machine uses a circular movement, however, this produces only a single roll at a time and the size of the yarn package limits the amount of continuous netting which can be made without stopping. The yarn package is mounted to rotate with the cambox which means that the speed of rotation and hence knitting is limited. Also, when the weft package is empty the machine must be stopped, reset and retensioned before it can then operate. This takes time and the overall speed of the machine is relatively slow. In addition, because the package rotates, a counterweight is required for balance, which is heavy, and also requires space within the machine which results in the overall machine taking up a relatively large area.

Existing circular knitting machines which are also designed to make a chain stitch structure use one of two generally accepted methods of supplying yarn to the needles of the knitting head. One method uses rotating or reciprocating guides which wrap the yarn around the needles. The elastic or other weft yarn is fed from the outside and is laid between the needles from the outside. This requires the weft yarn package to rotate with the cam box. In another method, stationary guides are present and rely on being struck by the needles so as to deflect the needles behind the yarn. The yarn is then caught by the open hook of the needle as the needle descends. Again, the weft yarn package revolves with the cam box.

These existing methods have a number of problems. The former method uses reciprocating guides requiring a machine which is relatively complicated and uses a considerable number of moving parts. In the second method, as the needles strike the guides there is considerable wear and tear on both the needles and the guides. This can cause splitting of the yarn and dropping of stitches as well as broken knitting elements.

An object of the present invention is to provide an improved knitting apparatus and yarn tensioning apparatus which obviates or mitigates the aforesaid disadvantages. This is achieved by providing a high speed knitting apparatus in which the elastic thread packages are mounted in a stationary position away from the knitting head and the yarn is fed from the exterior to the inside of each knitting head. Yarn is laid down outside each needle as the needle rises but falls behind the needle as the stitch is made allowing a stationary package. This results in reducing the revolving mass and the space necessary to accommodate the revolving mass. Furthermore, since the weft package is stationary, the commencement of wind on the package can be left as a tail which is knotted to the free end of a second package thus permitting the machine to run continuously without stopping to change packages.

A yarn guide is included for each needle of the knitting head so that yarn is moved under tension within the guide by a rotating member with minimal friction to a position where the needle will trap the yarn on its downward stroke.

This arrangement also permits a plurality of like knitting heads to be mounted in relatively close proximity in a single machine frame in such a manner that chain stitches can be fed from a power driven warp beam.

In a preferred arrangement, a plurality of knitting heads are mounted on a knitting head frame fed from a single warp and stationary creels can be mounted at the sides of the frame for supplying weft yarn to respective knitting heads. The knitting head frame can also include a fabric take-off roll for receiving the knitted fabric from each of the knitting heads. In an alternative arrangement the knitting heads may be mounted on a frame fed by a plurality of warps.

Each knitting head consists of a hollow cylinder having a plurality of grooves called tricks, in the outer wall, in which needles are disposed. Fixed feeders are disposed above the cylinder to offer the warp yarns to the needle. Disposed between the cylinder and the fixed feeder is a rotating weft feeder and yarn deflector. Rotation of the feeder is synchronized with a cam which raises the needles so that the feeder deflects the warp yarn within the yarn guide and guides and lays the elastic weft yarn outside the needle so that as the needle rises and falls the rubber yarn is trapped between the chain stitches and falls behind the needle as a stitch is made, in a spiral fashion to provide radial and circumferential elasticity or rigidity in the knitted fabric.

The fixed feeders are mounted radially in the supported feeder head support tube through which passes a tube mounted in bearings and carrying the weft feeder and deflector so that these can be rotated by a synchronised drive while feeding the inlay weft thread. The fixed feeders are wire staples which are shaped so that pre-tensioning of the yarn before it reaches the guide ensures that the yarn lies in front of and to one side of the open hook of the needle, and limits yarn movement when contacted with the placer. The staple has a curved portion for defining the path of the yarn as it is moved. The placer is a planar element which has a curved portion which pushes the yarn along the internal rim of the feeder from a first position to a second position where the yarn is trapped.

Accordingly, in one aspect of the present invention there is provided a knitting head for use with a knitting machine said knitting head comprising:

a fixed hollow cylinder having a cylinder wall with a plurality of circumferentially spaced grooves disposed in said wall, each groove having a needle with a hook at its upper end disposed therein, said hollow cylinder being disposed in a cam box having rotary cam means adapted to be coupled to each needle so that rotation of said rotary cam means causes displacement of each needle along its respective groove, stationary warp yarn delivery means disposed above said hollow cylinder for feeding a warp yarn from a remote location to each respective needle, rotatable weft yarn delivery means disposed between said hollow cylinder and said stationary warp yarn delivery means for delivering a weft yarn from a remote location outside the cylinder and from the inside to the outside of said rotatable weft delivery means so that the weft yarn is laid on the outside of each successively rising needle, the speed of rotation of said rotary cam means and said rotatable weft yarn delivery means being synchronised whereby in use, upon rotation of said rotary cam means and said rotatable weft yarn delivery means displacement of said needles causes chain stitches to be made which are fed inside said cylinder, and said rotatable weft yarn delivery means delivers said weft yarn outside said needle as said needles rise and the tension in said weft yarn pulls it over the top of the needle when it descends to be trapped in a subsequent stitch which falls behind the needle as the stitch is made, *said rotatable weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector having passage means through which a weft thread can be fed to be disposed outside the periphery of the hollow cylinder, the deflector including an outer cam portion for deflecting the warp yarn outside the periphery of the hollow cylinder as said deflector rotates.*

Preferably, said needle includes a pivotable latch for preventing said weft yarn from being hooked by said needle on a downward stroke. Conveniently, said grooves are disposed in an outer wall of said hollow cylinder and said needle hooks face outwardly.

Preferably also, the knitting head and needle grooves are generally vertically disposed and the warp yarn is fed to said knitting head in a generally vertical direction.

[Conveniently, said rotatable weft yarn delivery means comprises a generally planar horizontal weft yarn rotatable feeder and deflector element, said rotatable feeder and deflector element being coupled to a rotatable hollow yarn delivery tube which is adapted to be driven by drive means, said tube and said rotating feeder and deflector having passage means through which a weft thread can be fed to be disposed outside the needles as they rise. Conveniently, the deflector includes an outer cam portion for deflecting the warp yarn outside the periphery of the hollow cylinder as said deflector rotates.]

Accordingly, in another aspect of the invention there is provided a knitting machine comprising:

warp yarn delivery means for delivering a plurality of warp yarns to at least one knitting head, said knitting head being disposed in a knitting head frame and the knitting head receiving a plurality of warp yarns, said knitting head frame having a plurality of weft yarn package holders disposed at a remote position from said knitting head, at least one package holder being adapted to supply said at least one knitting head with weft yarn, and a fabric take-off roll disposed in said knitting head frame for receiving knitted fabric from said knitting machine, *said rotating weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector element having passage means through which a weft thread can be fed to be disposed outside the knitting head, the deflector element including an outer cam portion for deflecting the warp yarn outside the periphery of the knitting head as said deflector element rotates.*

Conveniently, said knitting machine has a plurality of knitting heads and said warp is driven by warp drive rollers and said warp yarn is fed across to said knitting head frame via a warp sheet. Conveniently also, yarn tensioning devices are provided for controlling the tension of each yarn fed to respective knitting heads.

Alternatively said knitting machine has a single head and said warp yarn is fed to said single head from a creel having a plurality of package holders.

Accordingly, in yet another aspect of the invention there is yet provided a method of knitting a tubular fabric [using the knitting head as defined above comprising the steps: feeding a plurality of warp yarn threads to a knitting head; feeding at least one weft yarn inside said knitting head from a remote location outside said knitting head; passing the weft yarn from the inside to the outside of said knitting head and disposing said weft initially around the periphery of said knitting head by a rotary movement outside said needles as they arise, and synchronising the movement of needles with respect to the rotating weft yarn delivery means within said knitting head to cause the weft yarn disposed around the periphery of said knitting head to be trapped between successive stitches of said warp yarn and to fall behind the needle as a stitch is made to create a tubular structure] *comprising the steps of feeding a plurality of warp yarn threads to a knitting head including vertically moveable needles, said knitting head including an inside and an outside, feeding at least one weft yarn inside said knitting head from a remote location outside the knitting head, delivering the weft yarn from the inside to the outside of said knitting head by a rotatable weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector element having passage means through which a weft thread is fed and disposing said weft yarn initially on the outside of said knitting head by a rotary movement of an outer cam portion of said deflector element to lay the weft yarn outside said needles as the needles rise, synchronizing movement and displacement of needles with respect to the delivery of the weft yarn to cause the weft yarn disposed around the outside of said knitting head to be trapped between successive stitches of said warp yarn and to fall behind the needle as a stitch is made to create a tubular structure.*

Conveniently, said method includes the step of feeding the warp and weft yarns from a remote stationary location. Preferably said warp yarns are fed vertically downwards to vertically disposed knitting heads.

Conveniently also, two weft package holders are provided for each knitting head and the package holders are adapted to be tied together to provide substantially continuous knitting by each knitting head to produce a continuous tubular fabric.

According to yet another aspect of the present invention there is provided warp yarn positioning apparatus when used in a high speed knitting apparatus comprising a knitting head having a plurality of needles, each of said needles being movable in a needle trick, said warp yarn positioning apparatus comprising a plurality of warp yarn guides each guide defining an aperture for receiving a respective warp yarn passing therethrough and for containing and controlling movement of each of said warp yarns, each warp yarn guide being mounted above a respective needle, at least one yarn deflecting means being adapted to rotate around said knitting head for engaging said warp yarn and for deflecting said yarns across said apertures from a first position to a second position such that, in said second position, each of said yarns is trapped by its respective needle as it descends.

Preferably, said guide is a hardened wire staple.

Conveniently, each of said guides are mounted in a common place on a shallow, cylindrical stationary dial, said dial being disposed above said knitting head.

Preferably also, said yarn deflecting means is a planar placing element, said planar placing element being movable around said knitting head and passing above each of said guides. Alternatively, the placing element can pass beneath the shaped aperture.

Conveniently, a plurality of placing elements are mounted on an elongate member connected to a cam box, said placing elements being associated with a cam of said cam box and said cam box being rotatable around said stationary dial.

These and other aspect of the invention will become apparent from the following description when taken in combination with the accompanying drawings in which.

Figure 1:
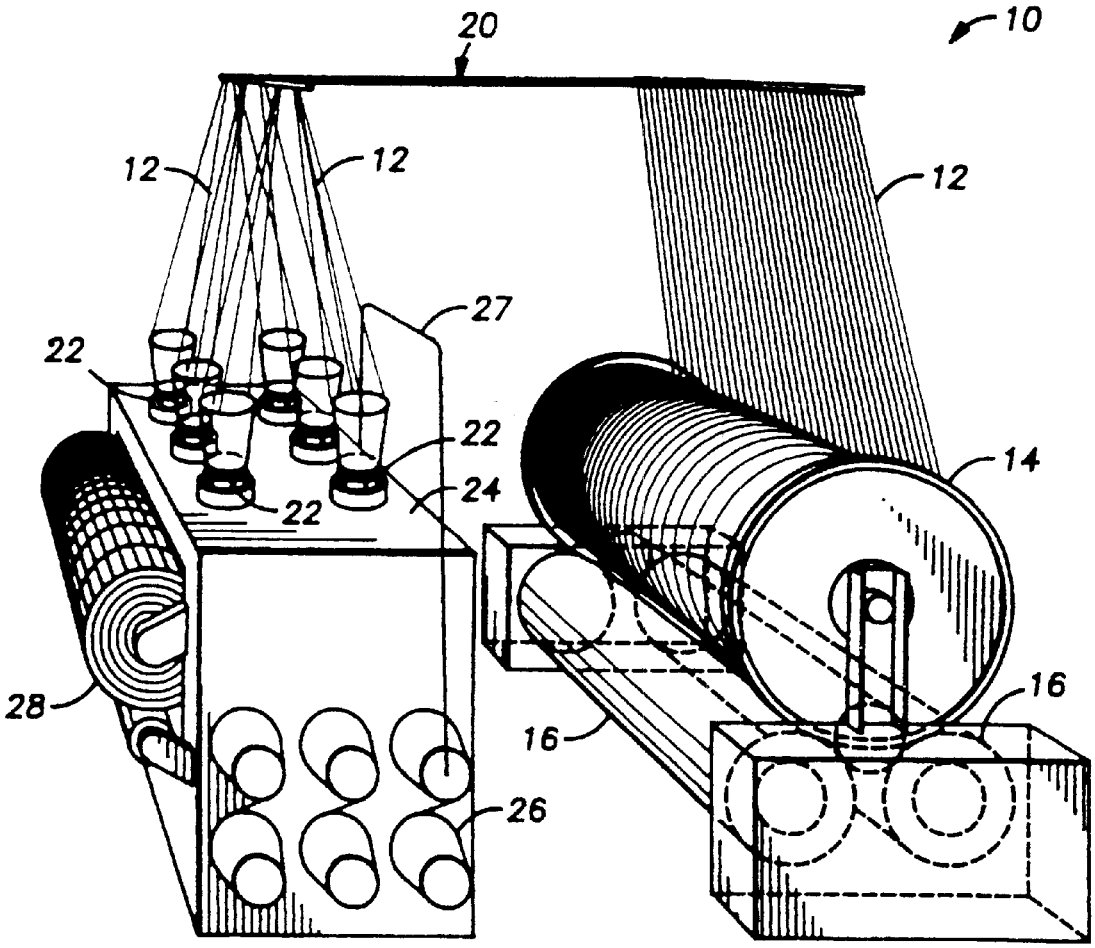
FIG. 1 is a diagrammatic and perspective view of a knitting machine consisting of a plurality of knitting heads in accordance with an embodiment of the invention.

Reference is first made to FIG. 1 of the drawings which depicts a high speed knitting machine generally indicated by reference numeral 10 in which warp yarn 12 is fed from a warp drum 14 driven by warp drive rollers 16 across a generally horizontally warp sheet 20. Tensioned warp yarns are downwardly of each of a plurality of knitting head 22 disposed at the top of a knitting head frame 24. This involves guiding the yarn around the needles to appropriate positions which facilitate knitting by yarn positioning apparatus as will be later described in detail. At the side of the knitting head frame 24 is disposed a plurality of weft yarn package holders 26 and the weft yarn 27 is also fed inside respective knitting heads on the frame. The tubular fabric is knitted, as will be later described in detail and the tubular fabric is supplied to fabric take-off rolls 28 for storing the knitted tubular fabric.

It will be appreciated that there is a plurality of separate knitting heads disposed in relatively close proximity on a single knitting head frame and the weft yarn package holders 26 are disposed at the side of the frame and one pair of weft package holders can be used to supply a single knitting head. Alternatively, a single package holder can be used to supply a single knitting head.

It will be understood that an advantage of this arrangement is that the tail of one package can be tied onto the free end of the next creel to provide substantially continuous knitting of the tubular fabric and also that the knitting heads are limited to a relatively small area minimising the volume and weight requirements.

Figure 2:
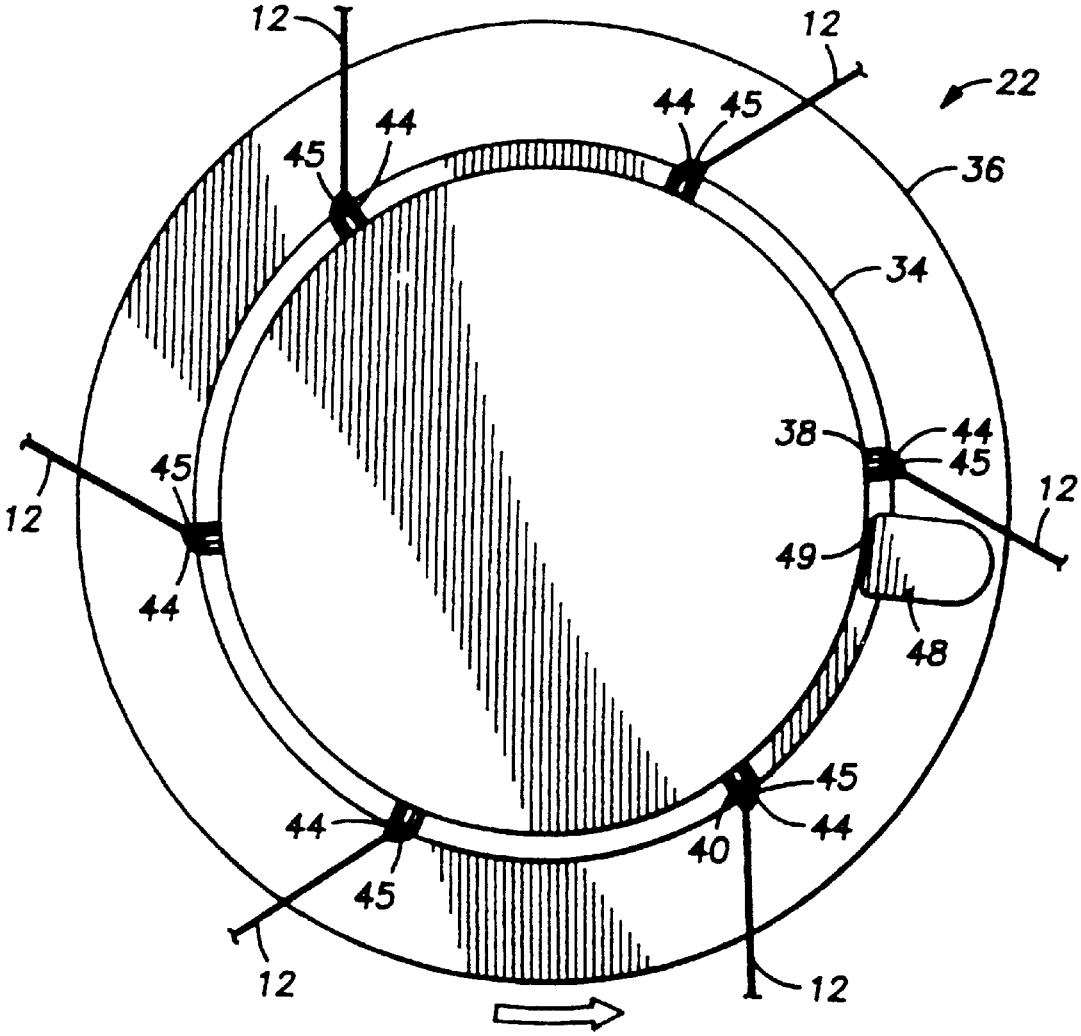
FIG. 2 is a plan view of a knitting head of the knitting machine shown in FIG. 1.
Figure 3:
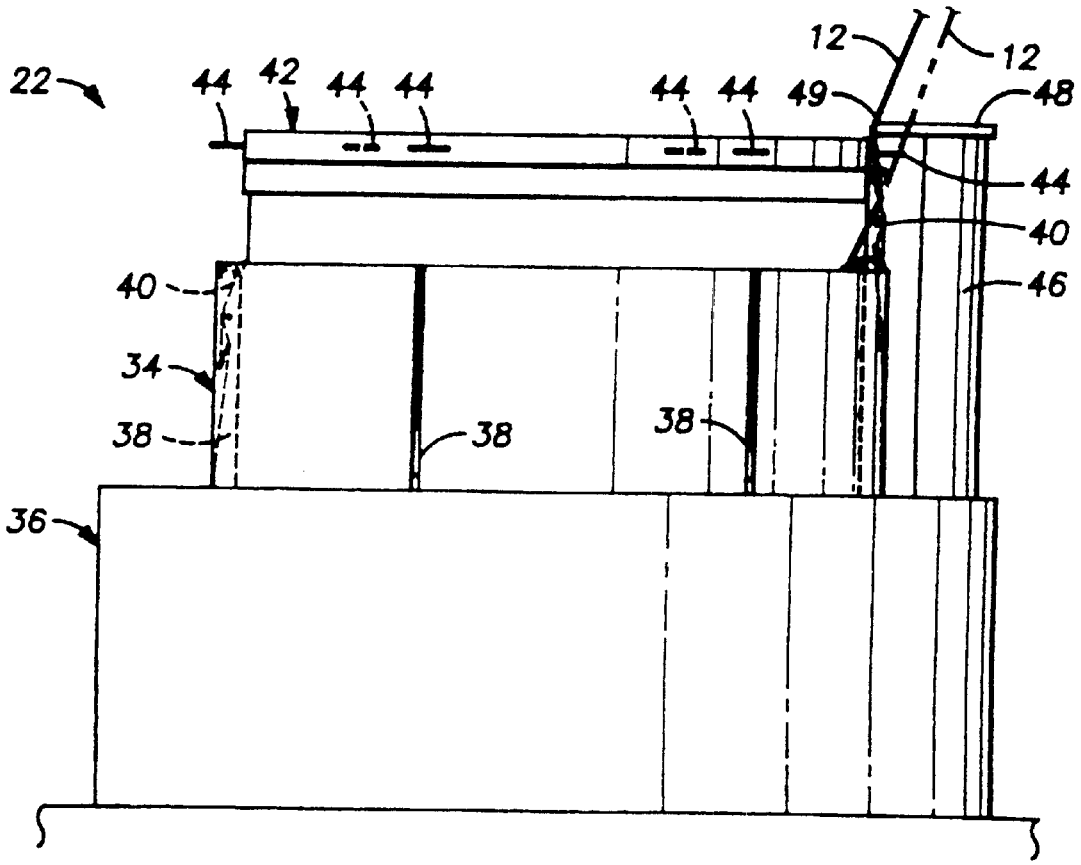
FIG. 3 is a front elevation of the knitting head shown in FIG. 2.
Figure 8:
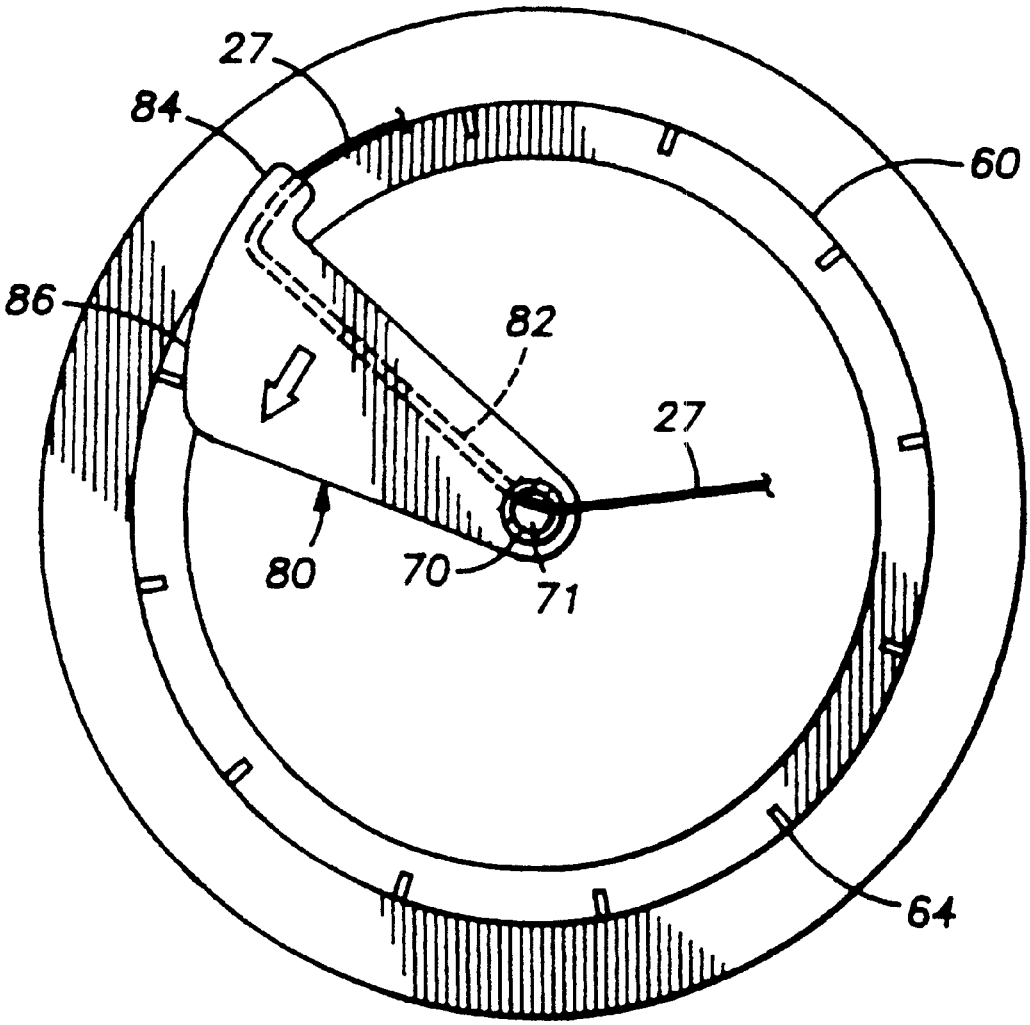
FIG. 8 is a plan view taken on the lines 3—3 of FIG. 7 and depicting the shape of the weft yarn feeder and deflector.

Reference is now made to FIGS. 2 and 3 of the drawings which show a knitting head 22 incorporating warp yarn positioning apparatus in accordance with an embodiment of the present invention. The knitting head 22 comprises a cylinder 34 mounted inside a rotatable cylindrical cam box 36. Spaced around the periphery of cylinder 34 are a plurality of needle tricks 38. A needle 40 is mounted in each needle trick 38 and each needle 40 is movable up and down the needle trick 38 by a mechanism, not shown in the interest of clarity, to facilitate the knitting process. Rotatable weft yarn delivery means are disposed between the hollow cylinder 34 and the stationary warp yarn delivery means 20 for delivering a weft yarn 27 from a remote location outside the cylinder 34 from the inside to the outside of the rotatable weft yarn delivery means so that the weft yarn 27 is laid down outside each successively rising needle 40. An example of a suitable weft yarn delivery means is shown in FIG. 8.

Mounted above the cylinder 34 is a shallow cylindrical dial 42. The dial 42 has disposed around the circumference of its outer wall a number of yarn guides 44 in the form of hardened wire stapled which are easy to produce and to locate on the dial 42. Each yarn guide 44 is disposed above a needle trick 38 and defines with the dial wall, an aperture 45 for receiving the yarn so that movement of the warp yarn 12 is guided within the aperture 45 around the needle 40 as will be described.

Mounted on the rotatable cam box 36 is an upstanding elongate member 46. The member 46 lies adjacent to the cylinder 34 and dial 42. Mounted on top of member 46 is a planar placing element or deflector 48 which has a curved edge portion 49 for engaging the yarn 12 as seen in FIG. 3.

The placing element 48 is rotatable around the dial 42 with the cam box 36 as it rotates around the cylinder 34. The placing element thus passes above each guide 44 and causes movement of the position of the yarn 12 within the aperture 45 within the wire guide 44 as will be described.

Figure 4:
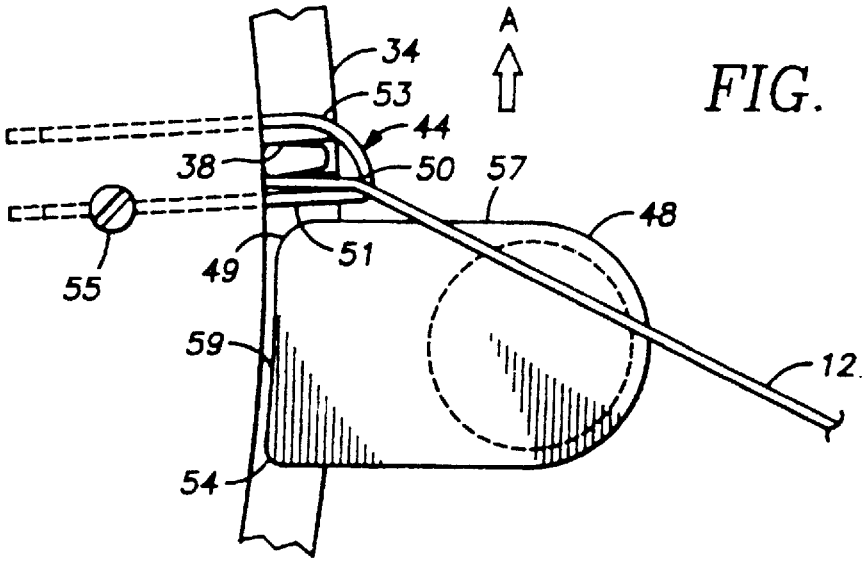
FIG. 4 is an enlarged view of part of the knitting head shown in FIG. 2.

Reference is now made to FIG. 4 of the drawings which is an enlarged view of part of the knitting head 32 showing one needle trick 38 and wire yarn guide 44. The yarn guide 44 is adjustable and is held in place by fixing screw 55. The guide has a first straight wire portion 51, a curved portion 53 which returns to the dial wall. Yarn 12 is shown tensioned and held to one side of the guide 44 where it is retained at a first corner 50 of the guide 44 between the straight portion 51 and curved portion 53. The curved edge portion 49 of the placing element 48 lies intermediate portions 57 and 59 and is proportioned to move the yarn from the corner 50 around portion 53 of the guide 44 so that the yarn can be trapped by a needle 40 as will be later described.

Figure 5A:
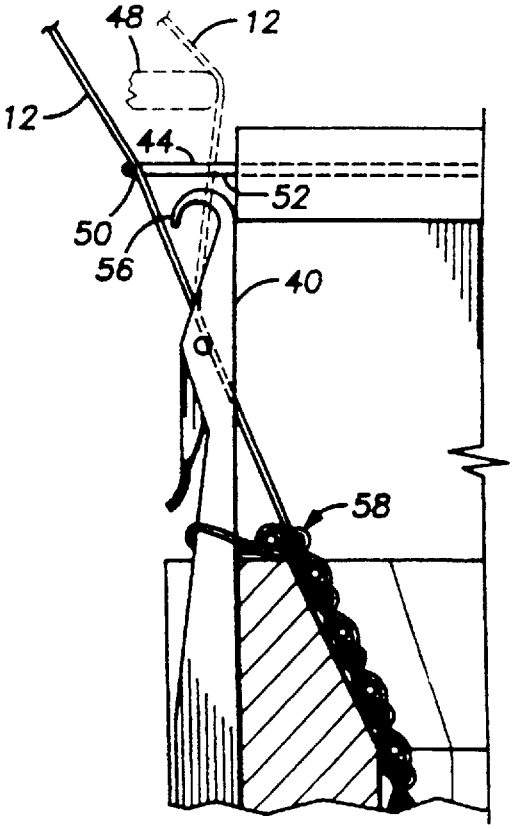
FIG. 5a, 5b are diagrammatic elevational views of the knitting head showing the operation of the apparatus in accordance with the embodiment of the present invention.
Figure 5B:
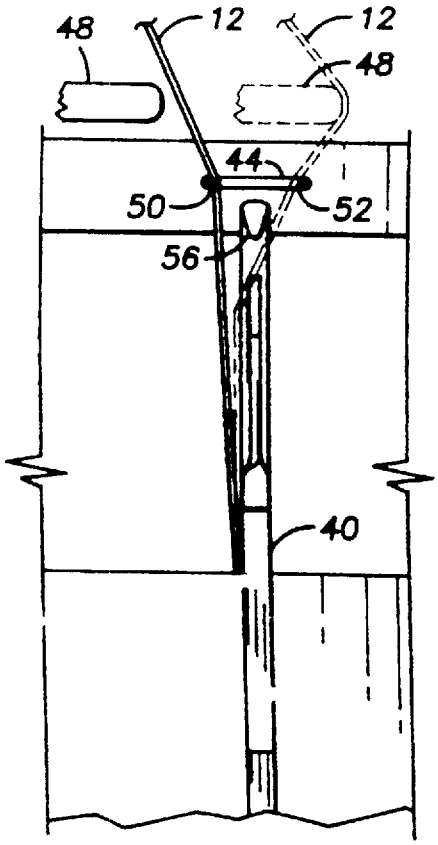

In operation, as the cam box rotates in the direction A as shown, the placing elements 48 passes above the yarn guide 44 and the portions 57 engages the yarn 12 which is pushed around the internal rim of curved portion 53 of the yarn guide 44 to a second corner 52, defined by the portion 53 and dial wall. The yarn is secured on the hook 56 of needle 40 as best seen in FIGS. 5a and 5b before the trailing end 54 of the placing element passes over the guide 44. The yarn 12 is trapped in the hook 56 until the trailing end 54 of the placing element 48 has passed over the guide 44.

Reference is now made to FIGS. 5a, 5b of the drawings which are diagrammatic side and front elevational views of the placing element engaging the yarn during operation of the apparatus. FIGS. 5a and 5b show that before placing element 48 passes over guide 44 the tensioned yarn 12 is positioned and retained in the first corner 50 of guide 44.

The yarn 12 passes down one side of the needle 40 in the raised position. As the placing element 48 rotates, the yarn, shown in broken outline, is pushed around the guide 44 to the second corner 52 best seen in FIG. 5b where it now lies across the raised needle 40. As described above, the yarn 12 will stay in this position until the placing element 48 is no longer above the guide 44. Before the placing element 48 has passed over guide 44 the needle 40 descends, the hook 56 traps the yarn 12 and pulls the yarn down into the previous chain stitch of chain stitches 58. When the placing element is no longer above the guide 44 the yarn will return to rest in first corner 50 of the guide 44 ready to receive the next pass of the placing element. This procedure is repeated for each needle around the periphery of the dial as the placing element 48 rotates with the cam box 32.

Figure 7:
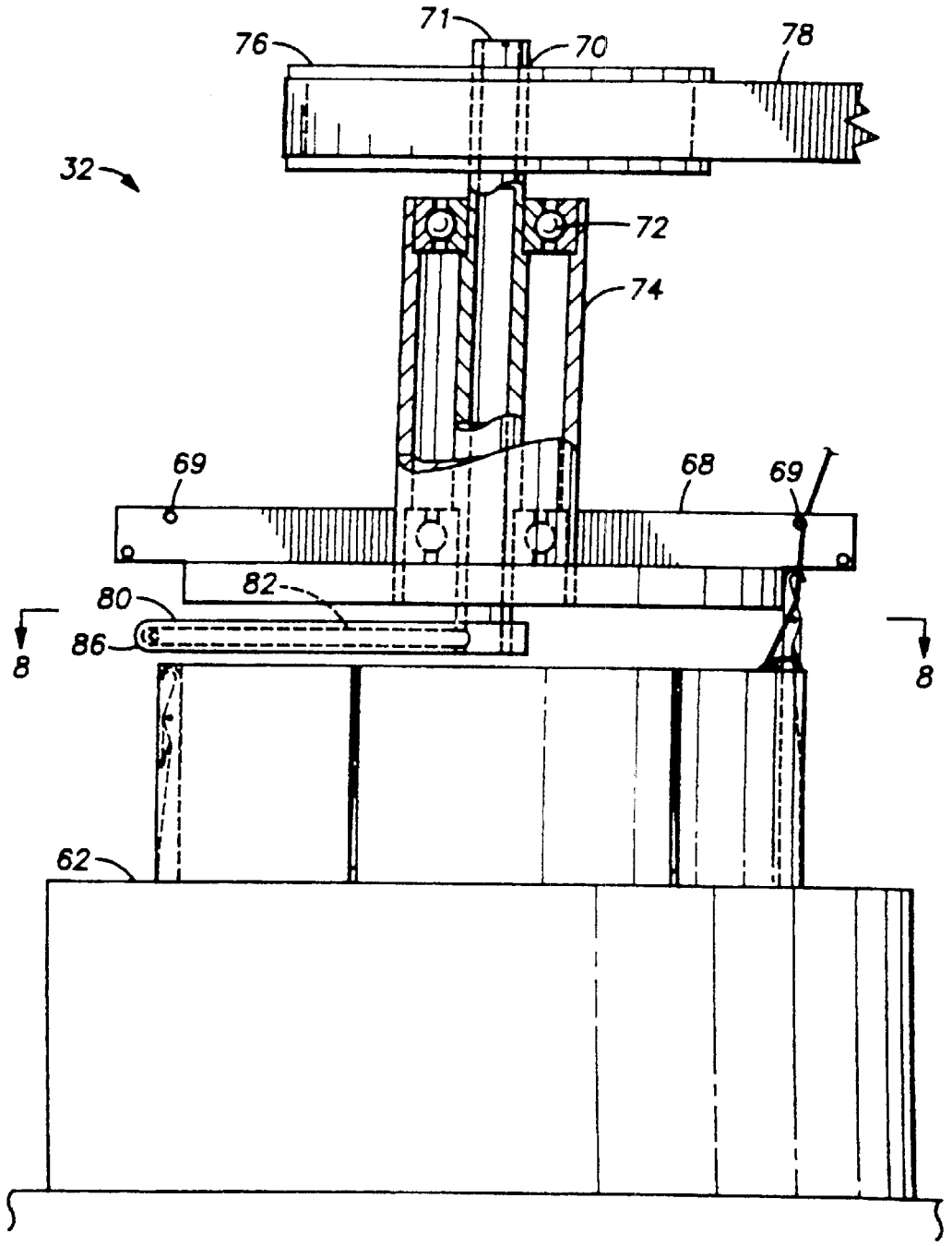
FIG. 7 is an enlarged said elevation of a knitting head in accordance with an alternative embodiment of the invention.

Reference is now made to FIG. 7 of the drawings which depicts a knitting head in accordance with an alternative embodiment of the present invention, which is mounted on a knitting frame in the same manner as the knitting heads 22 as shown in FIG. 1. Each knitting head 32 consists of a vertically disposed hollow cylinder 60 which in turn is mounted in a cam box 62. The cylinder 60 is fixed and on its exterior periphery a plurality of vertical grooves 64 are disposed spaced equidistantly around the circumference of the cylinder 60. As will be later described in detail, the grooves, or "tricks", as they are known in the art and each contain a single needle 66 for performing the knitting operation. Disposed above the cylinder 60 are the warp and weft yarn feeding means. The warp yarn feeding means is provided via a plurality of radially disposed feeding elements 68 of which two are shown in detail. Each warp feeding element consists of a generally horizontal bar having an aperture 69 therein through which the warp yarn passes to be gathered by the needle 66 as will be described. The warp yarn feeding elements 68 are stationary and are secured to the knitting frame.

As best seen in FIGS. 7 and 8 the weft yarn feeding means consists of two parts, the first part is a generally vertically disposed tube 70 which is mounted on bearings 72 within a tube support 74. The tube 70 is rotatable by a timing pulley 76 coupled to a timing drive belt 78 and coupled to the bottom of the tube 70 is a generally planar weft yarn feeder and warp yarn deflector generally indicated by reference numeral 80. The deflector has a channel 82 therein which communicates with the interior 71 of the tube 70 through which the weft yarn 27 can be fed to the tail 84 of the feeder and thence to the knitting head. It will be appreciated that the deflector 80 has an arcuate portion 86, parts of which extends beyond the outer radius of the cylinder 60, and this is for deflecting the warp yarn sideways beyond the periphery of the cylinder 60 during the knitting process to lay down the weft yarn 27 in a spiral fashion as will be described. It will be appreciated that the timing belt and timing pulley cause the tubular portion 70 and deflector 82 to rotate simultaneously and this rotation is synchronised with the rotation of the cam box which causes the needles to be displaced vertically upwards and downwards within the respective grooves as will be described.

Figure 9D:
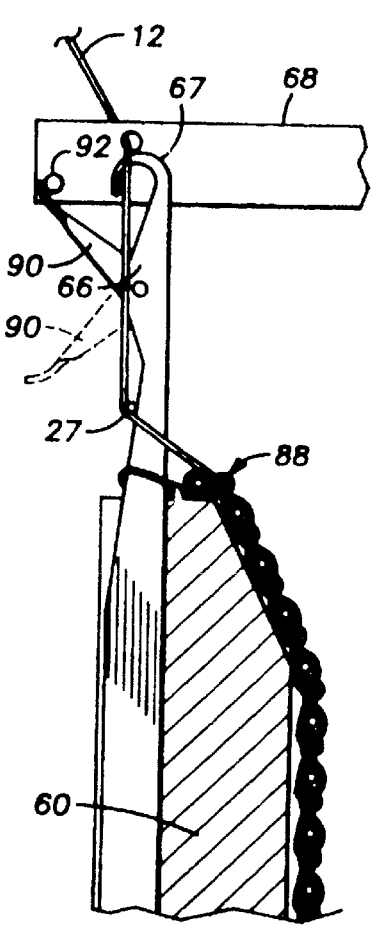
FIGS. 9a to g depict sequential stages in the knitting of a tubular fabric by the knitting head in accordance with the second embodiment of the present invention.
Figure 9C:
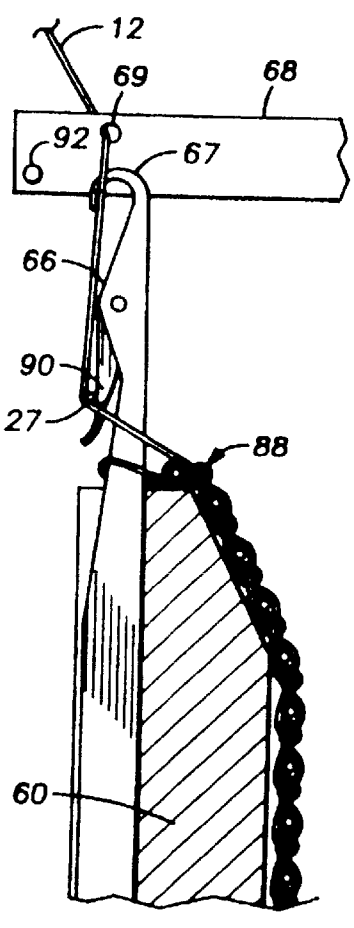
Figure 9B:
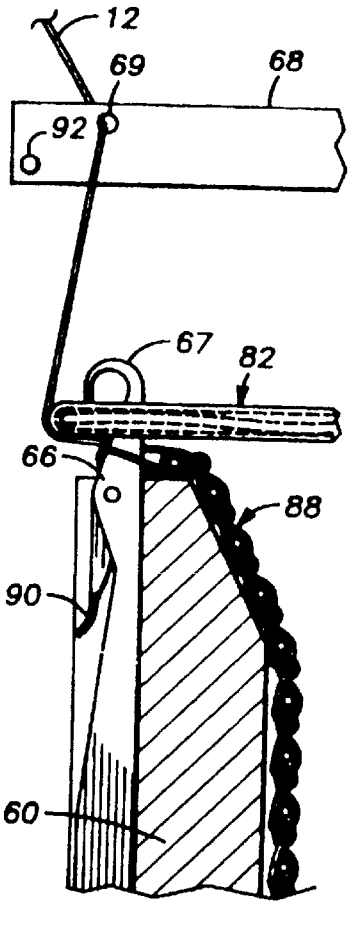
Figure 9A:
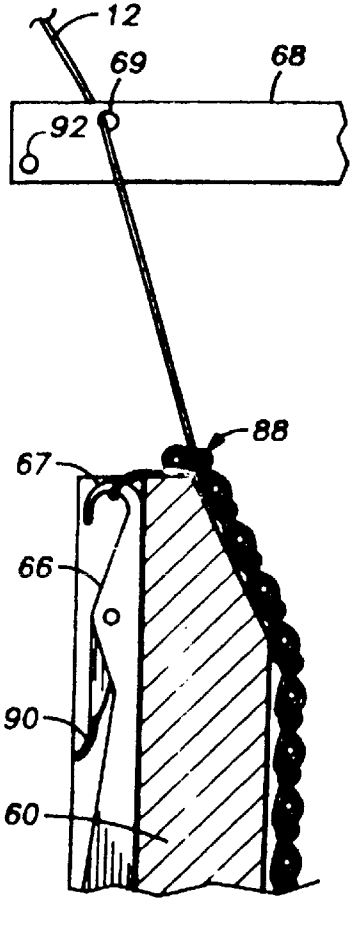
Figure 9G:
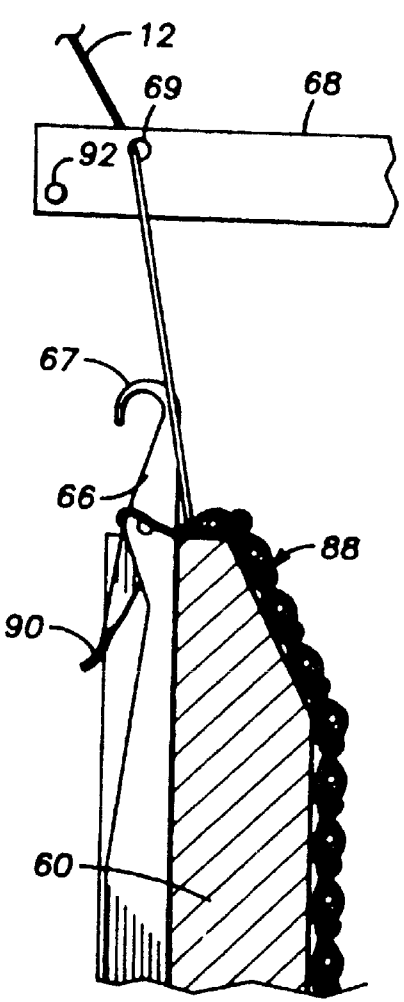

Reference is now made to FIGS. 9a through g of the drawings which depicts the operation of a single needle to knit part of a tubular fabric. It will be appreciated that the other needles in the knitting head operate in an identical manner. FIG. 9a depicts a warp yarn 12 fed through the aperture 69 of the stationary warp feeder element 68 to the needle 66 and then to the fabric 88 consisting of a chain stitch. In this figure the needle is shown totally within the groove 64. It will be seen that the needle carries a pivotable latch 90 for preventing inadvertent hooking of the elastic weft yarn as will be described.

Reference is now made to FIG. 9b which shows the needle 66 rising after the passage of the deflecting element 82 which causes the warp yarn 12 to be deflected outwards away from the needle 66 and simultaneously the weft yarn is laid on the open side or outside of the needle hook 67. After the passage of the deflecting element 82 the needle 66 rises further leaving the weft yarn 27 on the open latch 90 and permitting the warp yarn 12 to return to its original position.

Figure 9F:
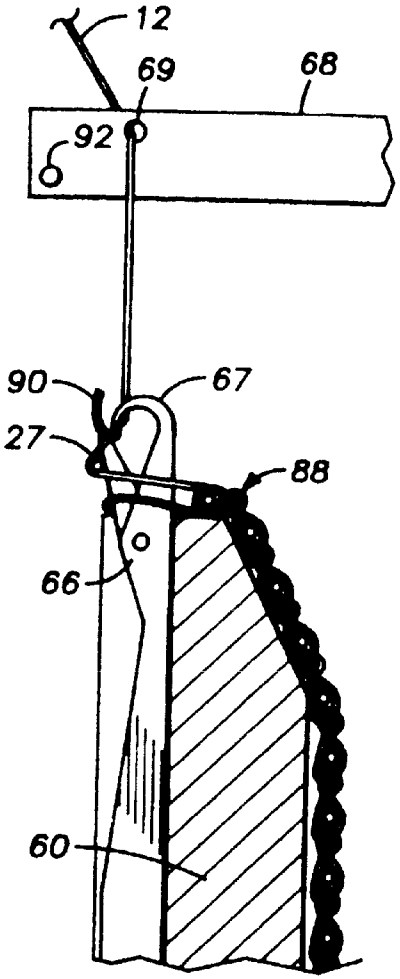
Figure 9E:
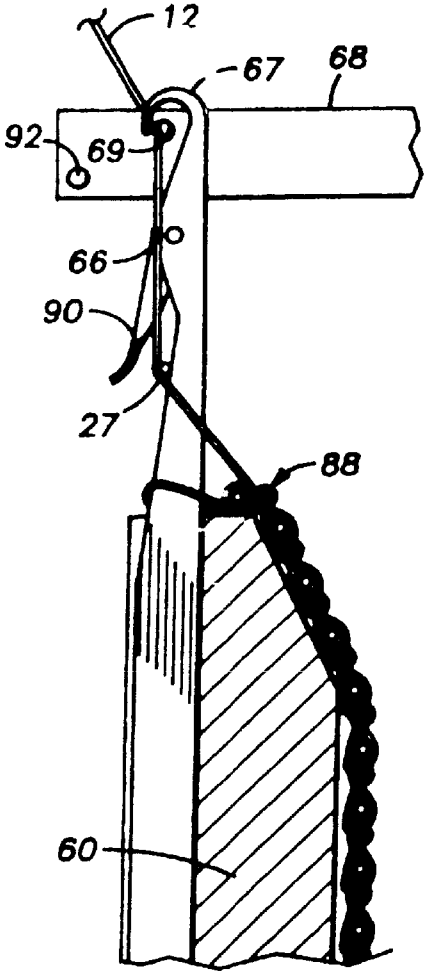

As the needle continues to rise as best seen in FIG. 9d the latch 90 slips from beneath the thread 27 and pivots upwardly to its unrestrained position but is prevented from closing the needle hook 69 by a latch stop 92 disposed on the element 68. It will also be seen in FIG. 9e that the latch 90 has returned to a downwardly oriented position. The warp thread 27 remains outside the needle 66 and lies under the open latch 90. As the needle descends as shown in FIG. 9f the latch is closed by the old stitch and the weft yarn 27 thus preventing the weft yarn 27 from being snagged in the hook 67.

When the needle has been retracted into the groove 64 the tension in the weft yarn 27 pulls it over the top of the needle 67 so that it falls behind the needle towards the centre of the cylinder, and on the next ascent of the needle for the next stitch, the weft yarn is trapped between successive stitches. When this is repeated for each needle in the knitting head a tubular fabric results which consists of a plurality of vertically disposed chain stitches coupled by a spirally wound weft yarn which is made of an elastic fabric. Depending on the number of cams fitted in the cam box the needle will continue to knit plain chain stitches until the next circuit of the feeder.

As the tubular fabric is knitted it is fed out as aforedescribed to the fabric take-off roll 28.

Figure 6:
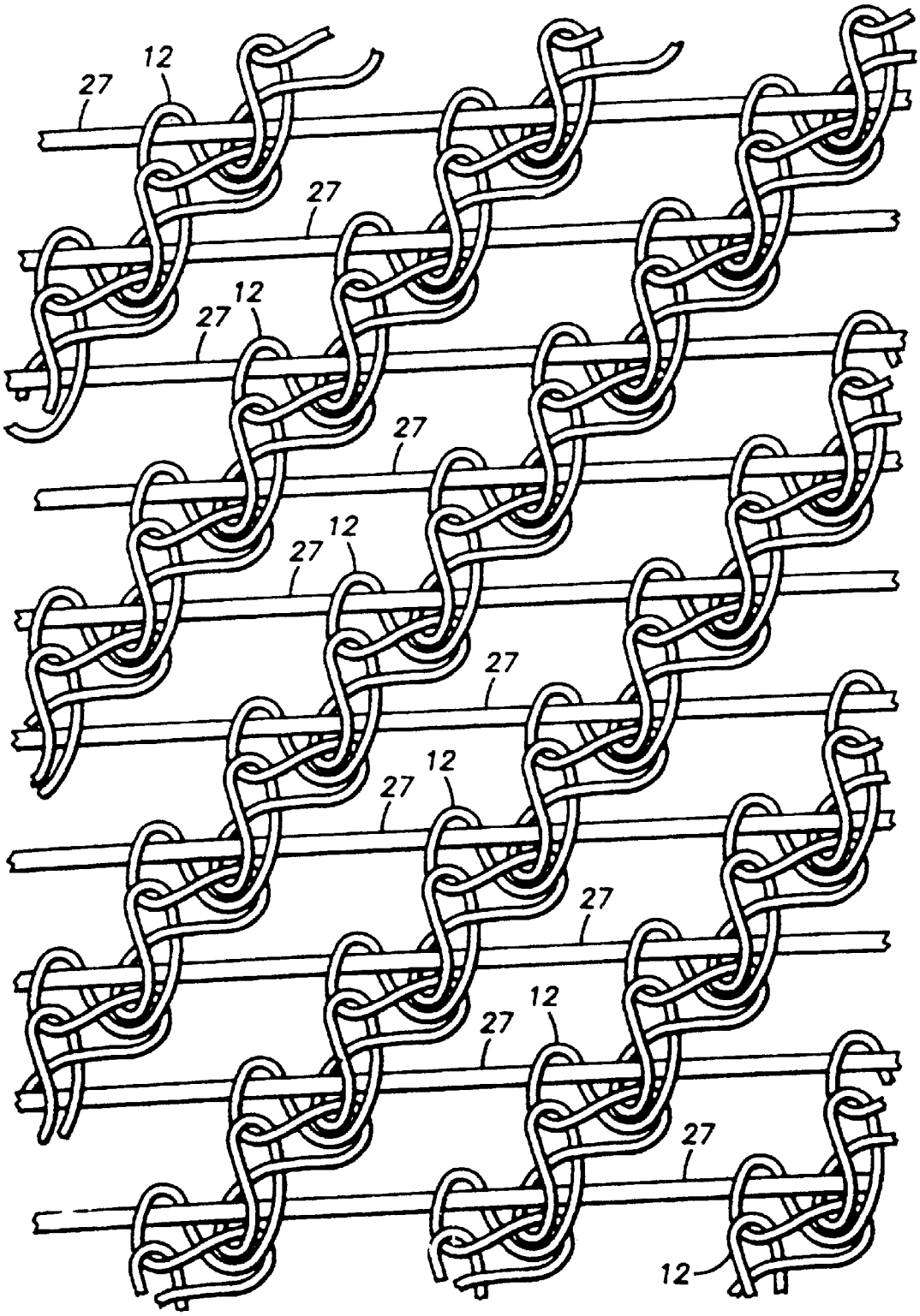
FIG. 6 depicts part of a net knitted with a knitting head shown in FIGS. 7, 8, and 9a–9g.

Reference is now made to FIG. 6 of the drawings which depicts part of a net fabric knitted with the knitting head shown in FIGS. 7, 8, 9a–9g. It will be seen that the yarns 12 cross the elasticated weft yarn 27 which is spirally wound obliquely. If an end of warp yarn thread is pulled the thread unravels clear of the fabric.

Several modifications can be made to the first embodiment hereinbefore described without departing from the scope of the invention. The wire guide and curved surface of placing element could be of any suitable shape as long as their engagement causes the yarn to be placed across the needle in such a position that it is trapped in the hook on the descent. The placing elements could also pass beneath the shaped aperture to move the yarn. Any suitable number of placing elements could be mounted around the cam box, one element per cam, as required to increase the number of stitches between inlays. Any number of needle tricks can be mounted around the cylinder with each needle trick having a corresponding yarn guide disposed above the trick on the dial. The yarn guide needs only to define an approximately horizontal shaped aperture to control the movement of the yarn. It will be understood that the yarn positioning apparatus may be used with a single head circular knitting machine fed from a creel as well as with a multiple head circular knitting machine fed from a beam.

This involves guiding the yarn around the needles to appropriate positions which facilitate knitting by yarn positioning apparatus as will be later described in detail.

It will be appreciated that modifications may also be made to the second embodiment hereinbefore described without departing from the scope of the invention. For example, it will be understood that the number of needles and the type of stitching may be varied as required to knit different tubular fabrics. In addition, it will be appreciated that the weft or warp threads could be doubled to provide a heavier stitch and the rotation rate of the deflector and rotary cam box drive can be varied although it has to be synchronized to permit a satisfactory knitting operation. It will also be appreciated that other means may be used to prevent the hook 67 from snagging on the yarn during the downward stroke although the present arrangement is straightforward and elegant in its simplicity. It will also be appreciated that the warp and weft yarns may be made of elastic or non-elastic materials although the warp yarn is generally non-elastic and the weft yarn is elastic. Also, two or more packages may be used to supply a single knitting head and this number can be varied. It will be appreciated that the knitting heads could be disposed in a non-vertical orientation, for example, horizontally and, if so the warp yarns also fed to the knitting heads horizontally.

As with the first embodiment it will be understood that a single knitting head could be used which is fed from a creel containing two or more packages instead of a beam or frame.

Advantages of the invention are that high speed knitting of a tubular fabric can be achieved in a simple and efficient manner. The knitting can be made continuous by simply tying the end of one package to the beginning of another package and this avoids the necessity for stopping and reloading the machine every time the package runs empty with the results that retensioning or resetting is also avoided. A plurality of knitting heads can be disposed in a single frame in proximity to each other to minimise the space requirements and to facilitate inspection of the machine and also production of the tubular fabric.

The yarn positioning apparatus is relatively inexpensive and uses a minimal number of moving parts. The yarn is positioned across the needle as it is tensioned minimising wear and tear of the knitting elements and yarn. Splitting of the yarn and the dropping of stitches is minimised. High yarn tensions are possible and hence the apparatus can be used with high speed knitting machines.

I claim:

1. A knitting head for use with a knitting machine, said knitting head comprising: a fixed hollow cylinder wall having an inside and an outside and with a plurality of circumferentially spaced grooves disposed in said wall, each groove having a needle with a hook at an upper end disposed therein, said hollow cylinder being disposed in a cam box having rotary cam means coupled to each needle so that rotation of said rotary cam means causes displacement of each needle along its respective groove, stationary warp yarn delivery means disposed above said hollow cylinder for feeding a warp yarn from a remote location to each respective needle *for being knitted into a warp chain*, rotatable weft yarn delivery means disposed between said hollow cylinder and said stationary warp yarn delivery means and including a weft yarn guide extending from the inside of the cylinder wall to the outside of the wall for delivering a weft yarn from the inside to the outside of said cylinder wall to lay the weft yarn externally of each needle *so that the weft yarn is trapped by the knitted warp chains without being knit itself*, said rotary cam means and said rotatable weft yarn delivery means being rotated in synchronization whereby, in use, upon rotation of said rotary cam means and said rotatable weft yarn delivery means displacement of said needles causes chain stitches to be made which are fed inside said cylinder, and said rotatable weft yarn delivery means delivers said weft yarn outside said needles as said needles rise and the tension in said weft yarn pulls the weft yarn over the top of the needle when the needle descends to trap the weft yarn in a subsequent stitch which falls behind the needle as the stitch is made.

2. A knitting head as claimed in claim 1 wherein each said needle includes a pivotable latch for preventing said weft yarn from being hooked by said needle on a downward stroke.

3. A knitting head as claimed in claim 1 wherein said stationary warp yarn delivery means comprises a plurality of stationary warp yarn delivery elements, a respective element being associated with a respective needle and being vertically disposed above said needle but being slightly offset therefrom to permit said needle to lie vertically above said element to collect a length of thread as it descends.

4. A knitting head as claimed in claim 3 wherein said element is in the form of a generally horizontal bar having an aperture therein through which said warp yarn is passed.

5. A knitting head [as claimed in claim 4] *for use with a knitting machine, said knitting head comprising:*

*a fixed hollow cylinder wall having an inside and an outside and with a plurality of circumferentially spaced grooves disposed in said wall, each groove having a needle with a hook at an upper end disposed therein,*

*said hollow cylinder being disposed in a cam box having rotary cam means coupled to each needle so that rotation of said rotary cam means causes displacement of each needle along its respective groove,*

*stationary warp yarn delivery means disposed above said hollow cylinder for feeding a warp yarn from a remote location to each respective needle for being knitted into a warp chain,*

*rotatable weft yarn delivery means disposed between said hollow cylinder and said stationary warp yarn delivery means and including a weft yarn guide extending from the inside of the cylinder wall to the outside of the wall for delivering a weft yarn from the inside to the outside of said cylinder wall to lay the weft yarn externally of each needle so that the weft yarn is trapped by the knitted warp chains without being knit itself, said rotary cam means and said rotatable weft yarn delivery means being rotated in synchronization whereby, in use, upon rotation of said rotary cam means and said rotatable weft yarn delivery means displacement of said needles causes chain stitches to be made which are fed inside said cylinder, and said rotatable weft yarn delivery means delivers said weft yarn outside said needles as said needles rise and the tension in said weft yarn pulls the weft yarn over the top of the needle when the needle descends to trap the weft yarn in a subsequent stitch which falls behind the needle as the stitch is made,*

*wherein said stationary warp yarn delivery means comprises a plurality of stationary warp yarn delivery elements, a respective element being associated with a respective needle and being vertically disposed above said needle but being slightly offset therefrom to permit said needle to lie vertically above said element to collect a length of thread as it descends, and*

*wherein said element is in the form of a generally horizontal bar having an aperture therein through which said warp yarn is passed, and* wherein each element includes a latch stop for restricting the upward pivotable movement of each latch on said needle.

6. A knitting head as [claimed in claim 1] *for use with a knitting machine, said knitting head comprising:*

*a fixed hollow cylinder wall having an inside and an outside and with a plurality of circumferentially spaced grooves disposed in said wall, each groove having a needle with a hook at an upper end disposed therein,*

*said hollow cylinder being disposed in a cam box having rotary cam means coupled to each needle so that rotation of said rotary cam means causes displacement of each needle along its respective groove,*

*stationary warp yarn delivery means disposed above said hollow cylinder for feeding a warp yarn from a remote location to each respective needle for being knitted into a warp chain,*

*rotatable weft yarn delivery means disposed between said hollow cylinder and said stationary warp yarn delivery means and including a weft yarn guide extending from the inside of the cylinder wall to the outside of the wall for delivering a weft yarn from the inside to the outside of said cylinder wall to lay the weft yarn externally of each needle so that the weft yarn is trapped by the knitted warp chains without being knit itself, said rotary cam means and said rotatable weft yarn delivery means being rotated in synchronization whereby, in use, upon rotation of said rotary cam means and said rotatable weft yarn delivery means displacement of said needles causes chain stitches to be made which are fed inside said cylinder, and said rotatable weft yarn delivery means delivers said weft yarn outside said needles as said needles rise and the tension in said weft yarn pulls the weft yarn over the top of the needle when the needle descends to trap the weft yarn in a subsequent stitch which falls behind the needle as the stitch is made, and* wherein said rotatable weft yarn delivery means comprises a generally planar horizontal weft yarn rotatable feeder and deflector element, said rotatable feeder and deflector element being coupled to a rotatable hollow yarn delivery tube driven by drive means, said tube and said rotating feeder and deflector having passage means through which a weft thread can be fed to be disposed outside the periphery of the hollow cylinder.

7. A knitting head as claimed in claim 6 wherein the deflector includes an outer cam portion for deflecting the warp yarn outside the periphery of the hollow cylinder as said deflector rotates.

8. A knitting head as claimed in claim 6 wherein said tubular yarn delivery tube is rotatable via bearing means in a support tube fixed and coupled to said stationary warp delivery means.

9. A knitting machine comprising:

warp yarn delivery means for delivering a plurality of warp yarns to at least one knitting head, said knitting head being disposed in a knitting head frame and the knitting head receiving a plurality of warp yarns *for knitting the warp yarns into distinct warp chains without being knit itself,* and having rotating weft yarn delivery means substantially disposed within the knitting head *for delivering a weft yarn to be trapped by the knitted warp chains*, said knitting head frame having a plurality of stationary weft yarn package holders disposed at a remote position from said knitting head and frame and for supplying said at least one knitting head with weft yarn, and fabric take-off roll disposed in said knitting head frame for receiving knitted fabric from said knitting machine.

10. A knitting machine as claimed in claim 9 wherein said knitting machine has a plurality of knitting heads and said warp is driven by warp drive rollers and said warp yarn is fed across to said knitting head frame via a warp sheet.

11. A knitting machine as claimed in claim 9 [or claim 10] wherein yarn tensioning devices are provided [from] *for* controlling the tension of each yarn fed to respective knitting heads.

12. A knitting machine as claimed in claim 9 wherein said knitting machine has a single head and said warp yarn is fed to said single head from a creel having a plurality of package holders.

13. A method of knitting a tubular fabric comprising the steps of:

feeding a plurality of warp yarn threads to a knitting head including vertically moveable needles *so as to knit the warp yarn threads into chains*, said knitting head including an inside and an outside, feeding at least one weft yarn inside said knitting head from a remote location outside the knitting head; delivering the weft yarn from the inside to the outside of said knitting head *so that the weft yarn is trapped by the knitted warp chains without being knit,* and disposing said weft yarn initially on the outside of said knitting head by a rotary movement *of an outer cam portion of a deflector element* to lay the weft yarn outside said needles as the needles rise, synchronizing movement and displacement of needles with respect to the delivery of the weft yarn to cause the weft yarn disposed around the outside of said knitting head to be trapped between successive stitches of said warp yarn and to fall behind the needle as a stitch is made to create a tubular structure.

14. A method as claimed in claim 13 wherein said method includes the step of feeding said warp yarn threads and said at least one weft yarn from a remote stationary location.

15. A method as claimed in claim 13 or claim 14 wherein said warp yarns are fed vertically downwards to vertically disposed knitting heads.

16. A method as claimed in claim 13 wherein the delivery of the weft yarn and the movement and displacement of the needles in the knitting head is synchronized.

17. A method as claimed in claim 13 wherein the remote location comprises two stationary package holders for each knitting head and yarn packages held on the package holders are tied together to provide substantially continuous knitting by each knitting head to produce a continuous tubular fabric.

18. A knitting head [as claimed in claim 1, further including] *for use with a knitting machine, said knitting head comprising:*

*a fixed hollow cylinder wall having an inside and an outside and with a plurality of circumferentially spaced grooves disposed in said wall, each groove having a needle with a hook at an upper end disposed therein,*

*said hollow cylinder being disposed in a cam box having rotary cam means coupled to each needle so that rotation of said rotary cam means causes displacement of each needle along its respective groove,*

*stationary warp yarn delivery means disposed above said hollow cylinder for feeding a warp yarn from a remote location to each respective needle for being knitted into a warp chain,*

*rotatable weft yarn delivery means disposed between said hollow cylinder and said stationary warp yarn delivery*

*means and including a weft yarn guide extending from the inside of the cylinder wall to the outside of the wall for delivering a weft yarn from the inside to the outside of said cylinder wall to lay the weft yarn externally of each needle so that the weft yarn is trapped by the knitted warp chains without being knit itself, said rotary cam means and said rotatable weft yarn delivery means being rotated in synchronization whereby, in use, upon rotation of said rotary cam means and said rotatable weft yarn delivery means displacement of said needles causes chain stitches to be made which are fed inside said cylinder, and said rotatable weft yarn delivery means delivers said weft yarn outside said needles as said needles rise and the tension in said weft yarn pulls the weft yarn over the top of the needle when the needle descends to trap the weft yarn in a subsequent stitch which falls behind the needle as the stitch is made, and* a warp yarn positioning apparatus *used in a high speed knitting apparatus, comprising a knitting head having a plurality of needles, each of said needles being movable in a needle trick*, said warp yarn positioning apparatus comprising a plurality of warp yarn guides, each guide defining an aperture for receiving a respective warp yarn passing therethrough and for containing and controlling movement of each of said warp yarns, each *warp* yarn guide being mounted above a respective needle, at least one *yarn* deflecting means [for rotating] *being adapted to rotate* around said knitting head for engaging said warp yarns and for deflecting said yarns across said aperture from a first position to a second position such that, in said second position, each of said yarns is trapped by [a] *its* respective needle as [the needle] *it* descends.

19. Yarn positioning apparatus as claimed in claim 18, wherein each yarn guide is a hardened wire staple.

20. Yarn positioning apparatus as claimed in claim 18 or claim 19 wherein each of said yarn guides are mounted in a plane on a shallow cylindrical stationary dial, said dial being disposed above said knitting head.

21. Yarn positioning apparatus as claimed in claim 18 wherein said yarn deflecting means is a planar placing element, said planar placing element being movable around said knitting head and passing above each of said apertures.

22. Yarn positioning apparatus as claimed in claim 21 wherein a plurality of placing elements are mounted on an elongate member connected to a cam box, said placing elements being associated with a cam of said cam box and said cam box being rotatable around said stationary dial.

23. Yarn positioning apparatus as claimed in claim 18, wherein said yarn deflecting means is by a planar placing element, said placing element being movable around said knitting head and passing beneath the yarn guides.

*24. A knitting head for use with a knitting machine, said knitting head comprising: a fixed hollow cylinder wall having an inside and an outside and with a plurality of circumferentially spaced grooves disposed in said wall, each groove having a needle with a hook at an upper end disposed therein, said hollow cylinder being disposed in a cam box having a rotary cam means coupled to each needle so that rotation of said rotary cam means causes displacement of each needle along its respective groove, stationary warp yarn delivery means disposed above said hollow cylinder for feeding a warp yarn from a remote location to each respective needle, rotatable weft yarn delivery means disposed between said hollow cylinder and said stationary warp yarn delivery means and including a weft yarn guide extending from the inside of the cylinder wall to the outside of the wall for delivering a weft yarn from the inside to the outside of said cylinder wall to lay the weft yarn externally of each needle, said rotary cam means and said rotatable weft yarn delivery means being rotated in synchronization whereby, in use, upon rotation of said rotary cam means and said rotatable weft yarn delivery means displacement of said needles causes chain stitches to be made which are fed inside said cylinder, and said rotatable weft yarn delivery means delivers said weft yarn outside said needles as said needles rise and the tension in said weft yarn pulls the weft yarn over the top of the needle when the needle descends to trap the weft yarn in a subsequent stitch which falls behind the needle as the stitch is made, said rotatable weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector having passage means through which a weft thread can be fed to be disposed outside the periphery of the hollow cylinder, the deflector including an outer cam portion for deflecting the warp yarn outside the periphery of the hollow cylinder as said deflector rotates.*

*25. A knitting head as claimed in claim 24 wherein each said needle includes a pivotable latch for preventing said weft yarn from being hooked by said needle on a downward stroke.*

*26. A knitting head as claimed in claim 24 wherein said stationary warp yarn delivery means comprises a plurality of stationary warp yarn delivery elements, a respective element being associated with a respective needle and being vertically disposed above said needle but being slightly offset therefrom to permit said needle to lie vertically above said element to collect a length of thread as it descends.*

*27. A knitting head as claimed in claim 26 wherein said element is in the form of a generally horizontal bar having an aperture therein through which said warp yarn is passed.*

*28. A knitting head as claimed in claim 27 wherein each element includes a latch stop for restricting the upward pivotable movement of each latch on said needle.*

*29. A knitting head as claimed in claim 24 wherein said rotatable weft yarn delivery means comprises a generally planar horizontal weft yarn rotatable feeder and deflector element, said rotatable feeder and deflector element being coupled to a rotatable hollow yarn delivery tube driven by drive means, said tube and said rotating feeder and deflector having passage means through which a weft thread can be fed to be disposed outside the periphery of the hollow cylinder.*

*30. A knitting head as claimed in claim 29 wherein the deflector includes an outer cam portion for deflecting the warp yarn outside the periphery of the hollow cylinder as said deflector rotates.*

*31. A knitting head as claimed in claim 24 wherein said tubular yarn delivery tube is rotatable via bearing means in a support tube fixed and coupled to said stationary warp delivery means.*

*32. A knitting machine comprising: warp yarn delivery means for delivery a plurality of warp yarns to at least one knitting head, said knitting head being disposed in a knitting head frame and the knitting head receiving a plurality of warp yarns and having rotating weft yarn delivery means substantially disposed within the knitting head, said knitting head frame having a plurality of stationary weft yarn package holders disposed at a remote position from said knitting head and frame and for supplying said at least one*

*knitting head with weft yarn, and fabric take-off roll disposed in said knitting head frame for receiving knitted fabric from said knitting machine, said rotating weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector element having passage means through which a weft thread can be fed to be disposed outside the knitting head, the deflector element including an outer cam portion for deflecting the warp yarn outside the periphery of the knitting head as said deflector element rotates.*

*33. A knitting machine as claimed in claim 32 wherein said knitting machine has a plurality of knitting heads and said warp is driven by warp drive rollers and said warp yarn is fed across to said knitting head frame via a warp sheet.*

*34. A knitting machine as claimed in claim 32 or claim 33 wherein yarn tensioning devices are provided from controlling the tension of each yarn fed to respective knitting heads.*

*35. A knitting machine as claimed in claim 32 wherein said knitting machine has a single head an said warp yarn is fed to said single head from a creel having a plurality of package holders.*

*36. A method of knitting a tubular fabric comprising the steps of: feeding a plurality of warp yarns threads to a knitting head including vertically moveable needles, said knitting head including an inside and an outside, feeding at least one weft yarn inside said knitting head from a remote location outside the knitting head; delivering the weft yarn from the inside to the outside of said knitting head by a rotatable weft yarn delivery means comprising a generally planar horizontal weft yarn rotatable feeder and deflector element, said rotatable feeder and deflector element being coupled to a rotatable hollow yarn delivery tube driven by drive means, said tube and said rotating feeder and deflector element having passage means through which a weft thread is fed and disposing said weft yarn initially on the outside of said knitting head by a rotary movement of an outer cam portion of said deflector element to lay the weft yarn outside said needles as the needles rise, synchronizing movement and displacement of needles with respect to the delivery of the weft yarn to cause the weft yarn disposed around the outside of said knitting head to be trapped between successive stitches of said warp yarn and to fall behind the needle as a stitch is made to create a tubular structure.*

*37. A method as claimed in claim 36 wherein said method includes the step of feeding said warp yarn threads and said at least one weft yarn from a remote stationary location.*

*38. A method as claimed in claim 36 or claim 37 wherein said warp yarns are fed vertically downwards to vertically disposed knitting heads.*

*39. A method as claimed in claim 36 wherein the delivery of the weft yarn and the movement and displacement of the needles in the knitting head is synchronized.*

*40. A method as claimed in claim 36 wherein the remote location comprises two stationary package holders for each knitting head and yarn packages held on the package holders are tied together to provide substantially continuous knitting by each knitting head to produce a continuous tubular fabric.*

*41. A knitting machine comprising: warp yarn delivery means for delivering a plurality of warp yarns to at least one knitting head, said knitting head being disposed in a knitting head frame and the knitting head receiving a plurality of warp yarns for knitting the warp yarns into distinct warp chains without being knit itself, and having rotating weft yarn delivery means substantially disposed within the knitting head for delivery a weft yarn to be trapped by the knitted warp chains, said knitting head frame having a plurality of stationary weft yarn package holders disposed at a remote position from said knitting head and frame and for supplying said at least one knitting head with weft yarn, and fabric take-off roll disposed in said knitting head frame for receiving knitted fabric from said knitting machine, wherein said knitting machine has a plurality of knitting heads and said warp is driven by warp drive rollers and said warp yarn is fed across to said knitting head frame via a warp sheet, and wherein yarn tensioning devices are provided for controlling the tension of each yarn fed to respective knitting heads.*

*42. A method of knitting a tubular fabric comprising the steps of: feeding a plurality of warp yarn threads to a knitting head including vertically moveable needles so as to knit the warp yarn threads into chains, said knitting head including an inside and an outside, feeding at least one weft yarn inside said knitting head from a remote location outside the knitting head; delivering the weft yarn from the inside to the outside of said knitting head so that the weft yarn is trapped by the knitted warp chains without being knit, and disposing said weft yarn initially on the outside of said knitting head by a rotary movement to lay the weft yarn outside said needles as the needles rise, synchronizing movement and displacement of needles with respect to the delivery to the weft yarn to cause the weft yarn disposed around the outside of said knitting head to be trapped between successive stitches of said warp yarn and to fall behind the needle as a stitch is made to create a tubular structure.*

* * * * *

UNITED STATES PATENT AND TRADEMARK OFFICE

CERTIFICATE OF CORRECTION

PATENT NO. : RE 38,161 E
DATED : July 1, 2003
INVENTOR(S) : Viney

It is certified that error appears in the above-identified patent and that said Letters Patent is hereby corrected as shown below:

Title page, Item [54] and Column 1, line 1,
Title, "SEED" should read -- SPEED --.

Column 14,
Line 60, "delivery" should read -- delivering --.

Column 15,
Line 19, "from" should read -- for --;
Line 22, "an" should read -- and --;
Line 26, "yarns" should read -- yarn --.

Column 16,
Line 19, "delivery" should read -- delivering --;
Line 43, "to" should read -- of --.

Signed and Sealed this

Twenty-fourth Day of February, 2004

JON W. DUDAS
*Acting Director of the United States Patent and Trademark Office*